Patented June 16, 1942

2,286,308

UNITED STATES PATENT OFFICE 2,286,308

FIREPROOFING

Charles M. Rosser, Fredericksburg, Va., assignor to Sylvania Industrial Corporation, Fredericksburg, Va., a corporation of Virginia No Drawing. Application November 13, 1941,
Serial No. 418,892

12 Claims. (Cl. 117—136)

The present invention relates to fireproofing. More particularly, it relates to fireproof articles formed of organic hydrophilic material and to the process of producing the same.

Articles formed from organic materials swelling in water, for example, sheets, films, tubes, filaments and the like formed of regenerated cellulose, are extensively used in the wrapping, packaging, textile, cordage and decorative arts. The use of these materials for many purposes has been restricted, however, in view of the fact that regenerated cellulose and other organic hydrophilic materials are inflammable to substantially the same extent as fibrous paper. This has restricted the use of regenerated cellulose and other organic hydrophilic materials for theatrical costumes, stage settings, store decorations and the like places where a large quantity of inflammable material would be a fire hazard.

Attempts have been made heretofore to fireproof organic hydrophilic materials but the rigid requirements for a successful fireproofing agent for this material have been a deterring factor. For example, a fireproofing agent for regenerated cellulose, in addition to the fireproofing function, must not impair the transparency of the material, must not render it brittle, must not cause it to discolor during aging, even when subjected to sunlight, must not crystallize on the surface after aging, and must retain its fireproofing qualities indefinitely.

It is an object of the present invention to provide a process of fireproofing organic hydrophilic material which overcomes all of the foregoing difficulties.

It is another object of the present invention to provide a fireproof organic hydrophilic article which is transparent, flexible, free from undesirable discolorations, and stable in the presence of sunlight and variable moisture conditions.

Other objects and advantages, if not specifically pointed out, will be apparent to those skilled in the art from the following detailed description of what are now considered the preferred forms of the invention.

The process of the present invention in general comprises passing a body of organic hydrophilic material, for example, regenerated cellulose in the form of a sheet, through an aqueous bath of alkyl guanidine phosphate, for example methyl guanidine phosphate, and suitably drying the excess moisture from the sheet.

The article of the present invention comprises a body of organic hydrophilic material, for example, regenerated cellulose impregnated with alkyl guanidine phosphate and, if desired, a suitable plasticizer.

The invention accordingly comprises the several steps and relation of one or more of such steps with respect to each of the others, and the article possessing the features, properties, and the relation of elements, which are exemplified in the following detailed disclosure, and the scope of the invention will be indicated in the claims.

It has been found that when an alkyl guanidine phosphate has been applied to an article formed from organic hydrophilic material the article will flame only when an independent flame or incandescent body is placed in direct contact with an uncharred portion of the article. Even when a direct flame or incandescent body is held in contact with one portion of such an article, flaming and charring will not continue after the area covered by and immediately surrounding the flame becomes charred, and there is no afterglow upon removal of the flame. Furthermore, the article can not be caused to flame by a nonincandescent body such as an overheated electrical fixture or the like. The article cannot therefore, propagate flame but on the contrary tends to extinguish small flames such as matches and lighted cigarettes. It therefore follows that the possibilities of fire loss from the usual sources of accidental conflagration are not only not increased but are actually reduced by the article of the present invention.

The alkyl guanidine phosphates as a class may be used in the practice of the present invention and the following are mentioned merely as representatives of this class: methyl guanidine phosphate, ethyl guanidine phosphate and propyl guanidine phosphate. The pyrophosphates may, of course, be used as well as the phosphates, and the phosphates and pyrophosphates are to be understood as including the hydrogen phosphates and pyrophosphates, respectively.

The organic hydrophilic material may comprise cellulose hydrate regenerated from viscose, cuprammonium solutions of cellulose, solutions of cellulose in inorganic solvents and organic solvents such as quaternary ammonium compounds, or from any other desired source; casein, gelatin, or any other desired hydrophilic material. The organic hydrophilic material may be formed into articles having any desired shapes.

For the purpose of illustrating the invention and not in limitation thereof, the following example of the process of the invention will be described:

Eight parts by weight of methyl ammonium phosphate, obtained by the use of 13.3 parts of a 60 per cent aqueous solution of methyl ammonium phosphate, is mixed with 6 parts of guanidine carbonate and the mixture is heated to drive off ammonium carbonate formed by the reaction of the methyl ammonium phosphate and the guanidine carbonate to form methyl guanidine phosphate.

The organic hydrophilic material, for example, a sheet of regenerated cellulose, preferably in the wet gel state, is passed through the bath formed as described above or placed within the bath and permitted to remain in contact with the bath for sufficient time for the liquid to thoroughly penetrate and impregnate the gel sheet. A period of one-half to one and one-half minutes at a slightly elevated temperature, for example, 40° C. has been found to be satisfactory. Thereafter the sheet is removed from the bath and the excess moisture is dried therefrom by the use of any desired type of drier.

Usually the fireproofing bath described above will contain a mixture of methyl ammonium phosphate and methyl guanidine phosphate since the reaction does not go to completion so as to utilize all of the methyl ammonium phosphate. This does not detract from the value of the fireproofing composition, however, since methyl ammonium phosphate is within itself a good fireproofing agent.

The concentration of the alkyl guanidine phosphate in the aqueous fireproofing bath should be varied to suit the hydrophilic material employed, but for most purposes 5 to 25 parts by weight of the alkyl guanidine phosphate and 95 to 75 parts water will be found to be satisfactory.

The organic hydrophilic material when treated with a fireproofing agent of the present invention is preferably in the wet gel state. The material may be in the wet gel state incidental to its original formation and prior to initial drying or may be placed in the wet gel state by soaking in water following an initial drying. If desired, a suitable wetting agent may be included in the wetting bath, such, for example, as tergitol, aerosol or monopole oil or other well known wetting agents. The wetting agent may be washed from the sheet prior to treatment with the fireproofing agent.

When fireproofing materials which are formed in a continuous length, for example, sheets, tubing or filaments formed of regenerated cellulose, the fireproofing step can be advantageously performed as the last step in the forming operations before the drying operation. In this manner, the fireproof characteristic is imparted to the article without reducing the speed of production of the article and additional handling steps are avoided.

Although the alkyl guanidine phosphates have some plasticizing action on the hydrophilic materials, it may be desirable to add an additional plasticizer to the sheet. The plasticizer used must be of the type which is not sufficiently inflammable to offset the fireproofing function of the alkyl guanidine phosphate. It has been found that formamide functions well in this capacity since it acts as a plasticizer for hydrophilic organic materials and in addition does not detract from the fireproofing function of the alkyl guanidine phosphates. If anything, the formamide adds to the fireproofing function since it comprises approximately 37 per cent nitrogen which is liberated upon combustion of the formamide and acts as a fire-retarding agent.

The fireproof article of the present invention is capable of use in forming stage and other theatrical decorations as well as advertising and decorative displays and the like, and is capable of being so used in large quantities without the introduction of fire hazards because the material of the article will not support combustion after the direct flame is removed, regardless of how large a quantity of the material is concentrated in a given space. It therefore follows that the material within itself does not increase the possibilty of fire, but, on the contrary, serves as a buffer against the transmission of fire from one point to another. In addition, the fireproof material of the present invention can be used for numerous industrial processes such as electrical insulation for wires and the like where resistance against charring as well as open combustion is a critical requisite.

The term "fireproof" as used throughout this specification and the claims is to be understood as including "flameproof."

Since certain changes in carrying out the above process, and certain modifications in the article which embody the invention may be made without departing from its scope, it is intended that all matter contained in the above description shall be interpreted as illustrative and not in a limiting sense.

The invention having been described, what is claimed is:

1. As an article of manufacture, a body of organic hydrophilic material having incorporated therein an alkyl guanidine phosphate in sufficient quantity to render the article fireproof.

2. As an article of manufacture, a body of regenerated cellulose having incorporated therein an alkyl guanidine phosphate in sufficient quantity to render the article fireproof.

3. As an article of manufacture, a body of cellulose hydrate having incorporated therein an alkyl guanidine phosphate and formamide, the alkyl guanidine phosphate being present in sufficient quantity to render the article fireproof.

4. As an article of manufacture, a body of cellulose hydrate having incorporated therein methyl guanidine phosphate in sufficient quantity to render the article fireproof.

5. As an article of manufacture, a body of cellulose hydrate having incorporated therein ethyl guanidine phosphate in sufficient quantity to render the article fireproof.

6. As an article of manufacture, a body of cellulose hydrate having incorporated therein propyl guanidine phosphate in sufficient quantity to render the article fireproof.

7. As an article of manufacture, a sheet of cellulose hydrate having incorporated therein an alkyl guanidine phosphate and formamide, the alkyl guanidine phosphate being present in sufficient quantity to render the article fireproof.

8. The process of producing a fireproof article comprising passing a body of organic hydrophilic material through an aqueous solution of alkyl guanidine phosphate and drying the excess moisture from the sheet.

9. The process of producing a fireproof article comprising passing a sheet of regenerated cellulose in the gel state through an aqueous solution of alkyl guanidine phosphate and drying the excess moisture from the sheet.

10. The process of producing a fireproof article comprising passing a body of cellulose hydrate through an aqueous solution of alkyl guanidine phosphate and drying the excess moisture from the body.

11. The process of producing a fireproof article comprising immersing a body of organic hydrophilic material in the wet gel state in an aqueous solution comprising alkyl guanidine phosphate for sufficient time for the solution to thoroughly impregnate the body and moving the body from the solution and drying the excess moisture therefrom.

12. The process of producing a fireproof article comprising immersing a body of cellulose hydrate in the wet gel state in an aqueous solution of alkyl guanidine phosphate for sufficient time for the solution to thoroughly impregnate the sheet, thereafter removing the sheet from the solution and drying the excess moisture therefrom.

CHARLES M. ROSSER.